Aug. 27, 1968  C. G. SCHROEDER  3,398,601
STEERING WHEEL
Filed April 4, 1966
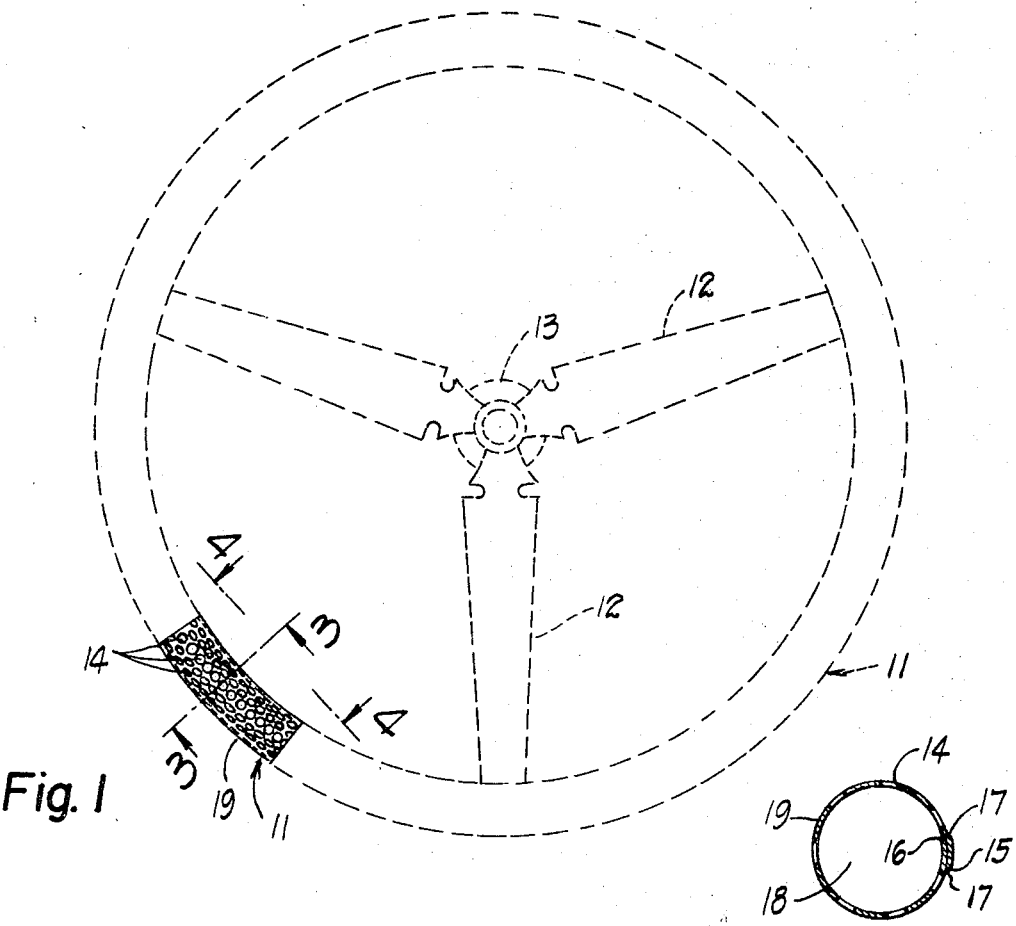
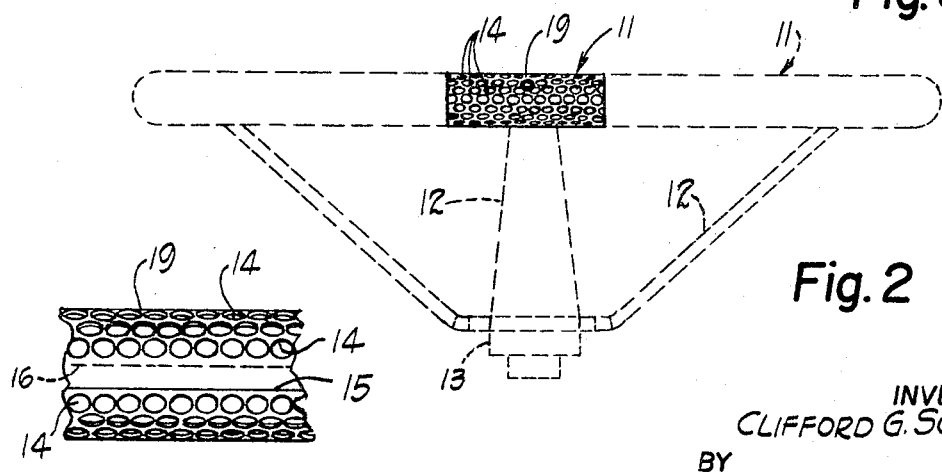
INVENTOR
CLIFFORD G. SCHROEDER
BY
ATTORNEYS

United States Patent Office 3,398,601
Patented Aug. 27, 1968

---

3,398,601
STEERING WHEEL
Clifford G. Schroeder, 4685 Harris Road,
Brecksville, Ohio 44141
Filed Apr. 4, 1966, Ser. No. 539,914
11 Claims. (Cl. 74—552)

---

ABSTRACT OF THE DISCLOSURE

An automotive steering wheel having a rim portion formed of a hollow metal tube, the major portion being perforated substantially uniformly throughout to leave a network of remaining intersecting metal filaments extending both circumferentially of the wheel and circumferentially of the tube cross-section, the areas of the perforations and of the metal network in said major portion being such that the perforations constitute a substantial area contacted by the operator's hand to provide effective ventilation through the perforations and the bore of the tube, while maintaining a strong interweaving network of metal filament in tubular form to provide an effective and convenient rim to grasp, the inner peripheral portion of the rim being overlapped unperforated metal to add strength to the rim.

---

My invention relates to steering wheel structures, such as automotive steering wheels.

My invention is directed to a steering wheel having a strong, durable rim which provides ventilation to the hands of the operator holding the rim, which provides a good surface frictionally resisting slippage of the operator's hands on the rim, which provides attractiveness and appeal, and which provides advantages in heat transferability not residing in the structure of prior steering wheels.

An object of my invention is to provide a steering wheel having a strong rim, and in which the strength-to-weight ratio is high.

Another object is the provision for ventilation for the hands of the operator grasping the rim of a steering wheel.

Another object is the provision for affording increased resistance to slippage of the operator's hands on the rim of a steering wheel.

Another object is the provision of a steering wheel of improved appearance and appeal.

Another object is the provision for better heat transferability characteristics of an automobile steering wheel rim whereby the rim does not feel as warm in summer nor as cold in winter as might be expected of a steering wheel rim of metal having the strength of solid metal throughout.

Another object is to provide the combination of the above objects in a steering wheel structure.

Other objects and a fuller understanding of the invention may be had by referring to the following description and claims, taken in conjunction with the accompanying drawings, in which:

FIGURE 1 is a plan view of an automotive steering wheel embodying my invention, it being understood that the solid line showing is repeated throughout the circumference of the rim of the wheel;

FIGURE 2 is a side elevational view of the same;

FIGURE 3 is an enlarged cross-sectional view taken through the line 3—3 of FIGURE 1; and FIGURE 4 is an enlarged partial view of the rim of the steering wheel looking in the direction of the arrows 4—4 of FIGURE 1.

My improved steering wheel is comprised of a rim 11, spokes 12, and hub 13 which is secured to an automotive steering column in the usual manner. As the hub 13 and spokes 12 may be of any conventional or well-known structure, they are shown in broken lines.

The rim 11 is of circular or ring form and of generally round cross-section. The portion of the rim 11 shown in solid lines in FIGURES 1 and 2 is repeated throughout the circumference of the rim. The cross-sectional view of FIGURE 3 is typical of the cross-sectional slope of the rim throughout its circumference. Similarly the view of the rim shown in FIGURE 4 is typical of the view of the rim throughout its circumference also looking in a direction radially outward from the center of the wheel.

The rim is tubular in form so as to have a hollow bore 18. Preferably, the rim is formed of a flat strip of perforated stainless steel alloy or the like of a gauge or thickness on the order of thirty-two thousandths of an inch (0.032"). The strip is provided with a plurality of apertures or perforations such as round holes 14 uniformly distributed about a horizontal band separating opposite solid or unperforated edge portions 15 and 16. The strip is rolled or otherwise formed into tubular shape and the edge portions 15 and 16 overlapped and there brazed, silver soldered, or welded as at 17 to firmly bond the overlapped edge portions 15 and 16 together. The formed tubing of appropriate length is then contoured or formed into a tubular ring or circle, the ends abutted together and bonded together by brazing, silver soldering, or welding, to thus form a continuous ring or circle with a bore extending around within the tubular rim thus formed.

The overlapped bonded edge portions are located on the radial inward side of the ring or circle thus formed. In the process of forming the rim or circle, the outermost wall of the tube is stretched or elongated somewhat and the holes on the outside circumference of the rim, originally round, are now elongated so as to form ovals or flattened circles. In the forming of the tube into a rim or circle, an appropriate yieldable and yet supporting core may be inserted within the tube so as to support it against collapsing or creasing and the core thereafter removed. Such a core may be a soft lead, a plastic material of appropriate yieldability, or other well-known material, and is removed after forming of the rim or circle, such as by melting the core and permitting it to flow outwardly of the tubular ring.

The resulting rim is composed of a web of network of metal filaments making up a body 19 having apertures or perforations 14 uniformly scattered throughout, except for the narrow band of overlapped edge portions 15 and 16 on the inner surface of the rim. The solid band of metal disposed on the inner surface of the rim has a width that preferably is on the order of one-fourth of the diameter of a cross-section of the tubular rim and next preferably is less than one-half of the diameter of a cross-section of the tubular rim. The apertured or perforated wall portion of the tubular rim is the major portion of the whole wall portion and the solid or non-apertured or non-perforated portion disposed on the radially inner side of the rim is the minor portion of the whole wall portion.

In the said major portion of apertured or perforated metal, the total area of the holes 14 is preferably on the order of forty percent of the total area of the said major portion and the total area of the metal wall portion or body 19 is thus preferably on the order of sixty percent. By other proportioning and spacing of the holes, the ratio may also be in the range of 50% to 60% area of total open spaces 14, and 50% to 40% of the total solid metal wall 19 of said major portion of the tube wall. It is desired that there be the maximum amount of well-distributed open spaces possible while maintaining required strength and rigidity for the remaining solid metal portion 19 of the rim.

The rim 11 thus formed is then secured, such as by silver soldering, welding or other suitable means to the outer or free end portions of spokes 12 extending out from hub 13. This completes the steering wheel ready for assembly with a steering column of an automotive vehicle.

It is to be noted that the resultant steering wheel produces novel and rather surprising results. Air may freely circulate through the bore 18 and through the holes 14. This provides ventilation for the hands of the operator grasping the rim. The nature of the outer surface of the rim broken up by the holes 14 provides resistance to slippage for the hands grasping the wheel. By the uniform distribution of metal separated by holes 14 and making up the network 19 of metal, there is provided strength and rigidity while utilizing a low ratio of weight for the volume of the rim. Also, the described distribution of metal of the perforated wall minimizes the loss of bodily heat from the hands to the metal rim and thus minimizes and surprisingly reduces the feeling of coldness of the rim to the hands in winter. Also, in summer, the metal rim does not feel as warm to the hands as might be felt if the metal rim were solid metal tube or formed without the described distribution of spaces and metal filaments. The disposition of the solid band formed by overlapped edge portions 15 and 16 provides strength at that location and also provides a solid portion for the bonding, by silver soldering, welding or the like, of the rim 11 to the spokes 12.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In an automotive steering wheel, the improvement of a rim comprised of a metallic hollow tube contoured to the shape of said rim, the major portion of said rim being perforated throughout to provide substantially uniformly distributed perforations throughout said major portion, said perforations being separated by a network of remaining metal, said perforation alternately recurring in transverse directions throughout said major portion, said network of remaining metal in said major portion of the hollow tube being composed of intersecting metal filaments extending throughout said major portion circumferentially of the wheel and circumferentially of the hollow tube, the total area of said perforations being on the order of 30% to 60% of the total area of said major portion, the bore of said hollow tube and the said perforations providing ventilation through the rim for the operator's hand grasping the rim.

2. A rim as claimed in claim 1 and in which the total area of said perforations are on the order of about 40% to 50% of the total area of said major portion.

3. A rim as claimed in claim 1 and in which the minor portion of said rim is a substantially unperforated band of metal disposed around the inner periphery of the rim and which band has a width of less than half the diameter of the said hollow tube.

4. A rim as claimed in claim 3 and in which said tube is roll formed from a strip of metal having relatively narrow edge portions of unperforated metal divided by a relatively broad portion of perforated metal, and in which said major portion of the rim is comprised of said broad portion of perforated metal and said minor portion is comprised of said narrow edge portions joined together in overlapped arrangement.

5. A steering wheel rim comprised of a hollow tube of metal formed in the form of said rim, said tube having perforations substantially uniformly distributed throughout the major portion of the annular surface of the cross-section of said tube, the remaining minor portion of the annular surface of the cross-section of the tube being disposed on the radially inward periphery of the said rim, said remaining minor portion being substantially less than said major portion of the annular surface of the cross-section of said tube, at least part of said minor portion around the innermost periphery of said rim circumferentially of the tube cross-section being twice the thickness of said major portion and providing strength to said rim, said perforations leaving a network of intersecting metal filaments extending about said major portion of the said annular surface both circumferentially of the wheel and circumferentially of the tube cross-section, the metal filament between adjacent perforations at their narrowest width being of less width than the major width of said perforations and the major width of said perforations being of the order of several times the width of said metal filaments at their narrowest width to provide well distributed ventilation through the perforations and provide well distributed filaments of said network, the said perforations communicating with the bore of said tube providing ventilation through the rim for the hand of the operator grasping the same, the filaments of the portion of the metal network engaged by said hand providing substantially less area of physical contact between said hand and an unperforated rim of like dimension.

6. A wheel as claimed in claim 5 and in which said perforations are uniformly spaced round openings of substantially equal area, and said metal filaments are the residue of metal of the tube surrounding said round openings.

7. A wheel as claimed in claim 5 and in which said at least part of the minor portion is comprised of unperforated edge portions of a metal strip superimposed in the general contour of the tube cross-section and joined in the formation of the metal tube from such strip.

8. A wheel as claimed in claim 5 and in which the total open area on the surface of the said major portion as provided by said perforations is on the order of 30% to 60% of the total surface area of said major portion including the said metal network.

9. A steering wheel as claimed in claim 5 and in which the metal of said hollow metal tube is a stainless steel alloy having a wall thickness in the range of 20 to 50 thousandths.

10. A steering wheel as claimed in claim 5 and in which the metal of said hollow metal tube is a stainless steel alloy having a wall thickness in the range of 32 thousandths.

11. A steering wheel rim comprised of a hollow tube of metal formed in the form of said rim, said tube having perforations substantially uniformly distributed throughout the major portion of the annular surface of the cross-section of said tube, the remaining minor portion of the annular surface of the cross-section of the tube being disposed radially inwardly of the outermost peripheral circumferential extent of said rim to provide a ring of unperforated metal imparting strength and rigidity to said rim, said remaining minor portion being substantially less than said major portion of the annular surface of the cross-section of said tube, said perforations leaving a network of intersecting metal filaments extending about said major portion of the said annular surface both circumferentially of the wheel and circumferentially of the tube cross-section, the metal filament between adjacent perforations at their narrowest width being of less width than the major width of said perforations and the major width of said perforations being of the order of several times the width of said metal filaments at their narrowest width to provide well distributed ventilation through the perforations and provide well distributed filaments of said network, the said perforations communicating with the bore of said tube providing ventilation through the rim for the hand of the operator grasping the same, the filaments of the portion of the metal network engaged by said hand providing substantially less area of physical contact between said hand and an unperforated rim of like dimension.

References Cited

UNITED STATES PATENTS

| 751,533 | 2/1904 | Metcalf | 16—117 |
| 2,054,703 | 9/1936 | Little et al. | 29—163 |

MILTON KAUFMAN, *Primary Examiner.*